United States Patent [19]

Zielie

[11] 4,029,276
[45] June 14, 1977

[54] MOUNTING BRACKET FOR TUBULAR MEMBERS

[75] Inventor: Richard C. Zielie, North Aurora, Ill.

[73] Assignee: Caterpillar Tractor Co., Peoria, Ill.

[22] Filed: Feb. 8, 1974

[21] Appl. No.: 440,804

Related U.S. Application Data

[63] Continuation of Ser. No. 282,350, Aug. 21, 1972.

[52] U.S. Cl. .............................................. 248/74 R
[51] Int. Cl.² ........................................... F16L 3/10
[58] Field of Search ........... 248/74 B, 74 R; 24/284

[56] References Cited

UNITED STATES PATENTS

| 631,234 | 8/1899 | Stevens | 248/74 R |
|---|---|---|---|
| 806,192 | 12/1905 | Russell | 248/74 R |
| 1,129,782 | 2/1915 | Bissell et al. | 248/74 R X |
| 2,396,837 | 3/1946 | Ellinwood | 248/74 B X |
| 2,396,925 | 3/1946 | Morehouse | 248/74 B X |
| 2,538,043 | 1/1951 | Roy et al. | 248/56 UX |
| 2,761,714 | 9/1956 | Cuskie | 248/74 R |
| 3,258,822 | 7/1966 | Schlesch et al. | 24/284 |
| 3,352,582 | 11/1967 | Mankin et al. | 403/56 |

FOREIGN PATENTS OR APPLICATIONS

| 509,529 | 9/1930 | Germany | 248/74 R |
|---|---|---|---|
| 13,950 | 6/1913 | United Kingdom | 248/74 R |
| 1,042,814 | 9/1966 | United Kingdom | 248/74 R |

Primary Examiner—Roy D. Frazier
Assistant Examiner—Rodney H. Bonck
Attorney, Agent, or Firm—Phillips, Moore, Weissenberger, Lempio & Majestic

[57] ABSTRACT

There is disclosed a mounting bracket for securing tubular members and the like. The bracket comprises a pair of members shaped to define a substantially annular portion for encircling a tubular member, and is connected together by means of a dovetail joint at one side of the tubular portion. Tabs extending outward from the other side of the tubular portion provide means for securing the two members to supporting structures and to apply clamping pressure.

1 Claim, 2 Drawing Figures

U.S. Patent   June 14, 1977   4,029,276
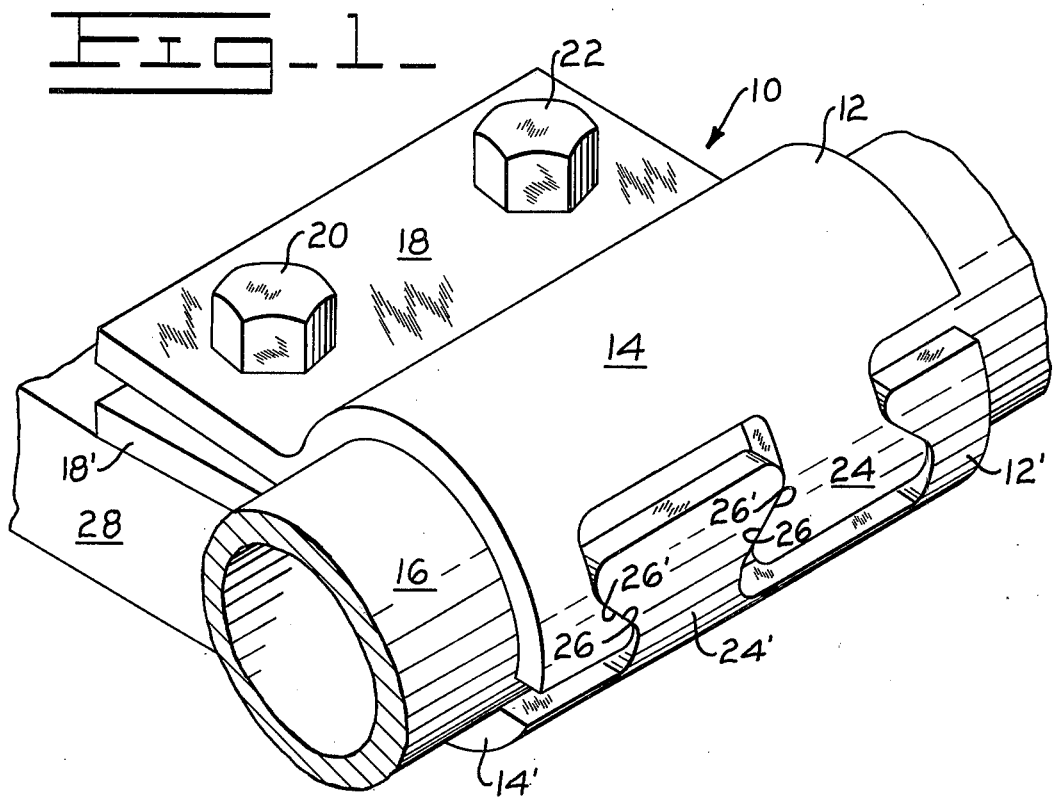
Fig-1-
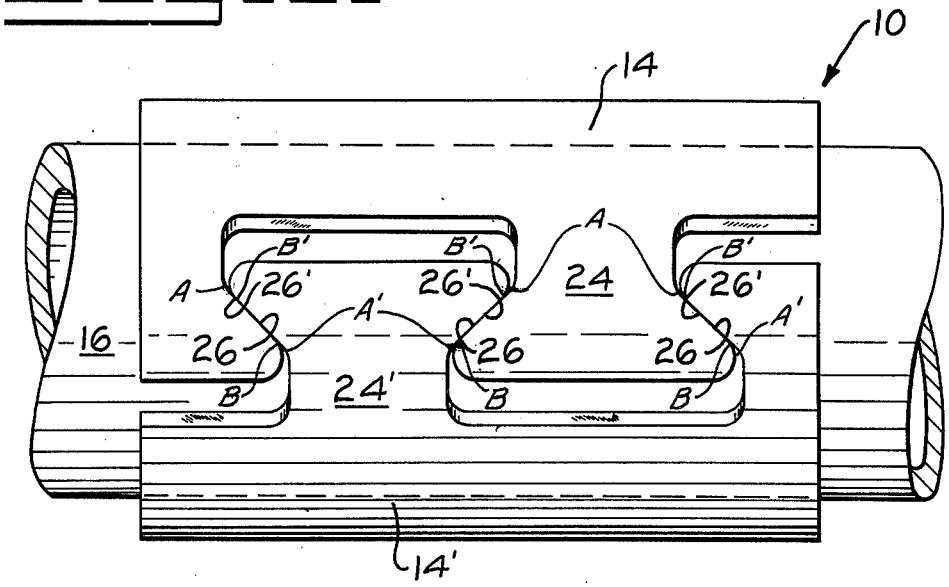
Fig-2-

MOUNTING BRACKET FOR TUBULAR MEMBERS

This is a continuation of Ser. No. 282,350, filed Aug. 21, 1972, pending.

BACKGROUND OF THE INVENTION

The present invention relates to brackets and pertains more particularly to a mounting bracket for tubular members such as hoses and the like.

Industrial machines and vehicles employ fluids for various functions such as for fuel and for power actuation or control of remote systems. These fluids are transported throughout various areas of such vehicles and machinery by suitable conduits such as rigid tubing and flexible hoses. Such conduits are normally secured or anchored to various structures and frame members throughout the machinery by suitable brackets or the like.

The prior art brackets for such attachments generally comprise a strap having a portion thereof to define a generally annular portion to surround the conduit. The two ends of the strap are brought together to form a tab or tabs which are brought together to clamp the annular portion of the bracket around the tubular member.

This type of bracket must be deformed a considerable amount in order to be placed around a tubular member or taken therefrom. This deformation results in substantial effort being required to resecure the bracket in place. Such deformation also frequently results in the bracket failing to secure the conduit to prevent it from slipping or creeping.

High pressure conduits frequently creep or otherwise slip when mounted in these conventional mounting brackets. This creeping frequently permits the conduit to move into interference with moving parts and to take up slack necessary for other moving parts. Such creeping or slipping also imposes undue stress on the connecting points, resulting in failure of the conduits and lines, or leakage.

SUMMARY OF THE INVENTION

It is a primary object of the present invention to provide a mounting bracket for tubular members that overcomes the above problems of the prior art.

Another object of the present invention is to provide a mounting bracket having an improved gripping area for conduits and the like.

A further object of the present invention is to provide an improved mounting bracket for conduits and the like wherein the mounting bracket is readily detachable from the conduit without deformation.

In accordance with the present invention, there is provided an improved mounting bracket for conduits and the like wherein the mounting bracket comprises a pair of members detachably secured together by means of a dovetail joint. In the preferred embodiment the dovetail joint is formed in an annular portion of the bracket, which extends around the tubular member. A tab extends from each of the bracket members on the opposite side of the annular portion from the dovetail joint to secure the members together and to supporting structure.

BRIEF DESCRIPTION OF THE DRAWINGS

The above and other objects and advantages of the present invention will become apparent from the following description when read in conjunction with the accompanying drawing, wherein:

FIG. 1 is a perspective view of a bracket in accordance with the present invention, illustrated in clamped position; and, FIG. 2 is an elevational side view of the bracket of FIG. 1.

DESCRIPTION OF PREFERRED EMBODIMENTS

With reference to the drawings, particularly to FIG. 1, a mounting bracket is generally designated by the reference numeral 10 and comprises a pair of bracket halves or members 12 and 12', which are for convenience and economy preferably identical in configuration. Each of the members 12, 12' includes a curved portion 14 and 14' which together define an annular body portion for encompassing and gripping a tubular member 16. The tubular member may be any suitable conduit means such as a rigid pipe or a flexible hose.

Each of the bracket halves also includes a generally flat tab portion 18 and 18' having suitable securing means such as a pair of holes for receiving capscrews 20 and 22. The tabs 18, 18' need not be identical and may be secured together in any suitable manner.

As best shown in FIG. 2, members 12 and 12' are releasably connected together at the outer ends of the curved portions 14, 14' by means of a dovetail joint comprising dovetail shaped tabs 24 and 24' which are formed to define alternate tabs and slots to interlockably engage when the halves are positioned as shown. A plurality of sloped flat surfaces 26, 26' formed by the sides of the dovetailed tabs 24, 24' and extending from respective first points A, A' spaced from the bottom of the slots formed between the tabs to respective second points B, B' spaced from the edge of the end of the strap member serve to provide broad loadng transmittal zones when the halves 12, 12' are assembled. The first points A, A' are spaced further from the bottom of the slot from the spacing between the second points B, B' and the edge of the strap member. The dovetail joint also permits a hinge-like action between the members.

In use of the illustrated embodiment, clamping force is exerted on the tubular member 16 by turning the capscrews 20 and 22 into internal threads provided in a mounting block or supporting structure 28. The bracket is sized so that adequate clamping force may be applied to the tubular member without completely drawing the flat tab portions 18, 18' together in abutting relationship. Thus capscrews 20 and 22, acting against the flat portions 18, 18' and the restraint, and hinged action afforded by surfaces 26, 26', provide a rigid clamping action to securely hold the tubular member in place.

The interlocking tab construction provided by the present invention permits the tubular member and clamp to be installed loosely on the mounting block, and then after positioning the tubular member to the desired position, the assembly may be clamped together by tightening the capscrews to a predetermined torque. The clamp may be easily disassembled by simply removing the capscrews 20 and 22 and sliding the halves 12, 12' apart.

While the present invention has been illustrated by means of a single embodiment, it is to be understood that changes and modifications may be made therein without departing from the spirit and scope of the invention as defined by the appended claims.

What is claimed is:

1. A rigid strap member for use in mounting tubular members, said strap member being generally rectangular with parallel edges at opposite ends joined by parallel sides;

the opposed major surfaces of said strap member defining parallel planar surfaces at one end of said strap member and parallel curved surfaces at the other end of said strap member, said curved surfaces at said other end of said strap member defining half of an annular clamping means for encircling and engaging a tubular member;

dovetail means consisting of one or more dovetail slots identical to each other and a portion only of not more than one further identical dovetail slot at one side of said strap member extending through said curved surfaces at the edge of said other end of said strap member, said slots being spaced from each other to provide one or more identical dovetail tabs of slightly smaller dimensions than said slots and a portion only of not more than one further identical dovetail tab at the other side of said member;

each said slot defining a pair of mirror image elongated rectilinear side surfaces extending toward each other from respective first points spaced from the bottom of said slot to respective second points spaced from the edge of said other end of said strap member said first points being spaced further from the bottom of said slot than the spacing between said second points and said edge of said other end of said strap member; and said strap member having a pair of apertures through said planar surfaces at said one end thereof, said apertures being equally spaced from said one end of said strap member and from the longitudinal center line of said strap member;

whereby a first one of said strap member may be inverted with respect to a second one of said strap member and said dovetail means of said first and second ones of said strap member secured together under tensile stress about a tubular member and to supporting means by passing fastening means through said apertures in said other end of each of said first and second ones of said strap member.

* * * * *